US009551525B2

(12) United States Patent
Watson et al.

(10) Patent No.: US 9,551,525 B2
(45) Date of Patent: Jan. 24, 2017

(54) ELECTRIFIED COOLER SYSTEM

(71) Applicants: Bradley Charles Watson, Tyler, TX (US); Jerry Brown, Lindale, TX (US); Benjamin Michael Phillips, Lindale, TX (US)

(72) Inventors: Bradley Charles Watson, Tyler, TX (US); Jerry Brown, Lindale, TX (US); Benjamin Michael Phillips, Lindale, TX (US)

( * ) Notice: Subject to any disclaimer, the term of this patent is extended or adjusted under 35 U.S.C. 154(b) by 341 days.

(21) Appl. No.: 14/286,018

(22) Filed: May 23, 2014

(65) Prior Publication Data

US 2015/0338159 A1 Nov. 26, 2015

(51) Int. Cl.

| | |
|---|---|
| ***A01M 19/00*** | (2006.01) |
| ***F25D 29/00*** | (2006.01) |
| ***F25D 3/08*** | (2006.01) |
| ***F25D 3/06*** | (2006.01) |
| ***G08B 13/14*** | (2006.01) |
| ***G08B 21/20*** | (2006.01) |
| *F25D 23/02* | (2006.01) |

(52) U.S. Cl.

CPC ............... *F25D 29/006* (2013.01); *F25D 3/06* (2013.01); *F25D 3/08* (2013.01); *G08B 13/1418* (2013.01); *G08B 21/20* (2013.01); *F25D 23/028* (2013.01)

(58) Field of Classification Search

CPC ...... A01M 23/38; A01M 29/24; F25D 29/006; F25D 3/08; F25D 23/028

USPC ........... 340/565, 573.1, 573.2, 657; 206/719, 206/723; 367/139; 43/98; 119/908

See application file for complete search history.

(56) References Cited

U.S. PATENT DOCUMENTS

| | | | |
|---|---|---|---|
| 5,031,792 | A | 7/1991 | Russo, Sr. |
| 5,043,702 | A | 8/1991 | Kuo |
| 5,790,028 | A | 8/1998 | Lee |
| 5,864,292 | A | 1/1999 | Roestenberg et al. |
| 6,271,753 | B1 | 8/2001 | Shukla |
| 6,380,856 | B1 | 4/2002 | Johnson et al. |
| 6,445,295 | B1 | 9/2002 | Abshire et al. |
| 6,518,889 | B2 | 2/2003 | Schlager et al. |
| 6,677,857 | B2 | 1/2004 | Bara et al. |
| 7,337,908 | B2 | 3/2008 | Dedmon |
| 7,958,995 | B2 | 6/2011 | Dedmon et al. |
| 7,963,397 | B2 | 6/2011 | Seagle et al. |
| 2005/0279124 | A1 | 12/2005 | Maldonado |
| 2005/0280544 | A1 | 12/2005 | Mishelevich |

*Primary Examiner* — William Gilbert

(74) *Attorney, Agent, or Firm* — Lee & Hayes, PLLC

(57) ABSTRACT

A shocking cooler includes an ice chest cooler which has a lid and lower portion. A first conductor is located within the bottom portion and extrudes from one of the side interior surfaces of the ice chest cooler. A second conductor is located near a lower lip region, and is separated a distance from the first conductor. The first conductor and second conductor are joined to a power supply at alternate connections (either positive (+) or negative (−)) by connection cable(s). The power supply is connected to a switch, which allows the shocking ice chest cooler to be turned on or off. Water is introduced to the ice chest cooler, and is in contact with the first conductor. When a burglar attempts to reach into the ice chest cooler, his hand is immersed into the water, thereby completing the circuit and issuing an electrical shock.

20 Claims, 6 Drawing Sheets

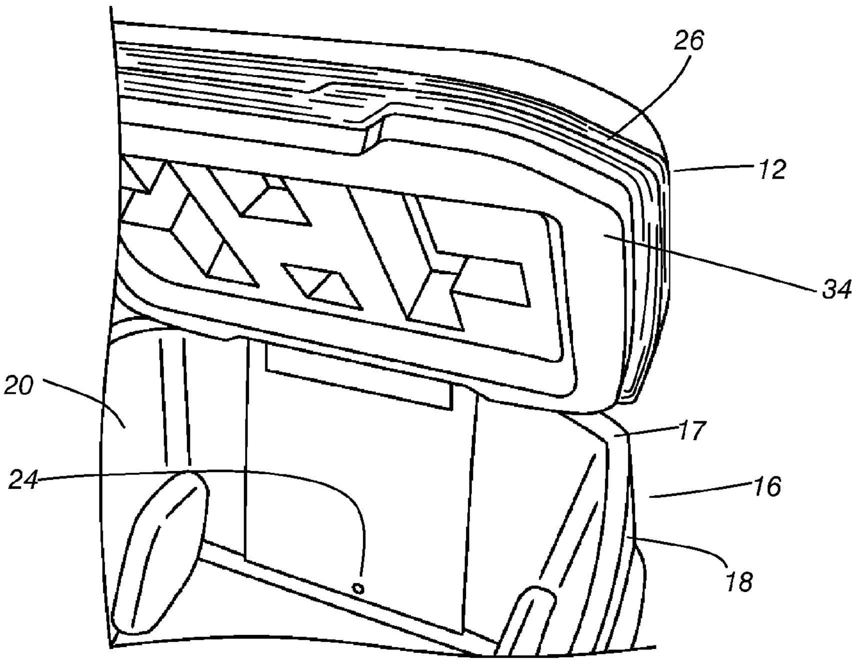
FIG. 7
FIG. 8
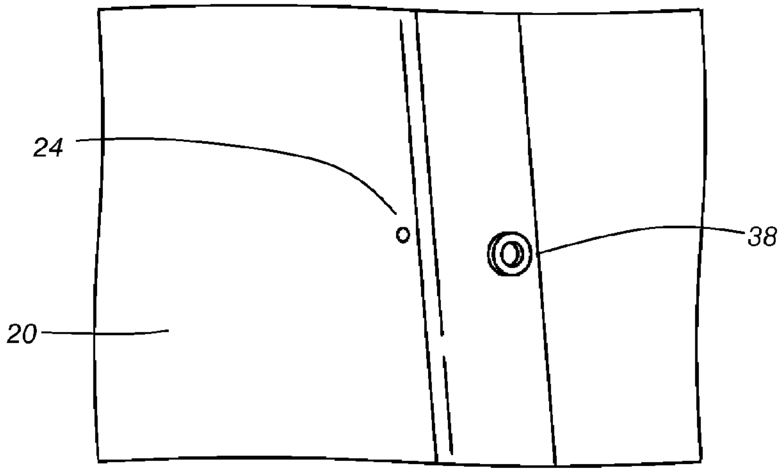

ELECTRIFIED COOLER SYSTEM

BACKGROUND

The invention applies to coolers. More specifically, the invention applies to consumer coolers such as portable ice chests. Embodiments are directed towards such a cooler which has a shocking mechanism which will send an electric shock into the water or ice stored within the cooler. The shocking mechanism can be controlled by a remote.

Ice chest coolers are commonly used to store and to keep refrigerated drinks and food for later use. It is common for such ice chest cooler to be filled with ice or other liquid. The ice typically melts within the cooler, forming a body of water within the interior of the ice chest cooler. It is desirable to provide a deterrent against unwanted intrusion and theft of the contents. Therefore, it would be an advantage to provide for an ice chest cooler with a shocking deterrent system which is capable of protecting its contents from theft, especially when water or other liquid is introduced to the cooler.

SUMMARY

It is an object of the current invention to provide a for an ice chest cooler which introduces an electric shock to a would be burglar of its contents.

It is a further object of the current invention that such ice chest cooler introduce an electric shock through water present in the ice chest cooler.

It is yet a further object of the current invention that the ice chest cooler have a first conductor which makes contact with water present in the cooler, the first conductor is separated a distance from a second conductor which does not make contact with the water, and that the first conductor and second conductor are oppositely charged.

A shocking cooler according to embodiments of the current invention has a shocking deterrent system which is capable of protecting its contents from theft, especially through water or other liquid present in the cooler. The shocking cooler has a pair of oppositely charged conductors, which introduce an electric shock when a would be theft reaches into the water to take its contents. The shocking cooler herein includes an ice chest cooler which has a lid and lower portion. A first conductor is located within the bottom portion and extrudes from one of the side interior surfaces of the ice chest cooler. A second conductor is located proximate to a lower lip region, and is separated a distance from the first conductor. The first conductor and second conductor are joined to a power supply at alternate connections (either positive (+) or negative (−)) by connection cable(s). The power supply is connected to a switch, which allows the shocking ice chest cooler to be turned on or off. Water is introduced to the ice chest cooler, and is in contact with the first conductor. The second conductor does not make contact with the water due to its placement near the lid. When a would be burglar attempts to reach into the ice chest cooler, his hand is immersed into the water and his arm makes contact with the second conductor, thereby completing the circuit. An electrical shock is thereby issued to the burglar, thwarting attempts to obtain the contents of the ice chest cooler.

In a first preferred embodiment, the first conductor is a metallic node located near the bottom of the lower portion. The second conductor exists as a conducting band located on a lip lid region. The power supply utilizes one or more 9V batteries and is located in a compartment, which is accessible from a side exterior surface. Connection cables extend through the insulating region and join the first conductor and second conductor to the power supply. A transmitter is connected to the power supply and switch, which allows the shocking ice chest cooler to be turned on or off by a remote control unit.

In other embodiments, the location and configuration of the second conductor may vary. For example, the second conductor may either be located on the lid, or on the lower portion, located on the lower lip region. The second conductor may be configured as an individual element, or a plurality of elements. Moreover, the current, voltage, and switch may vary.

BRIEF DESCRIPTION OF THE DRAWINGS

FIG. 7 is a front perspective view of a shocking cooler with the lid open showing a closer view of the first electrode and second electrode, according to the embodiment of FIG. 1.

FIG. 8 is a closer view of the first electrode and drain inside the shocking cooler, according the embodiment of FIG. 1.

DETAILED DESCRIPTION

Figure 1:
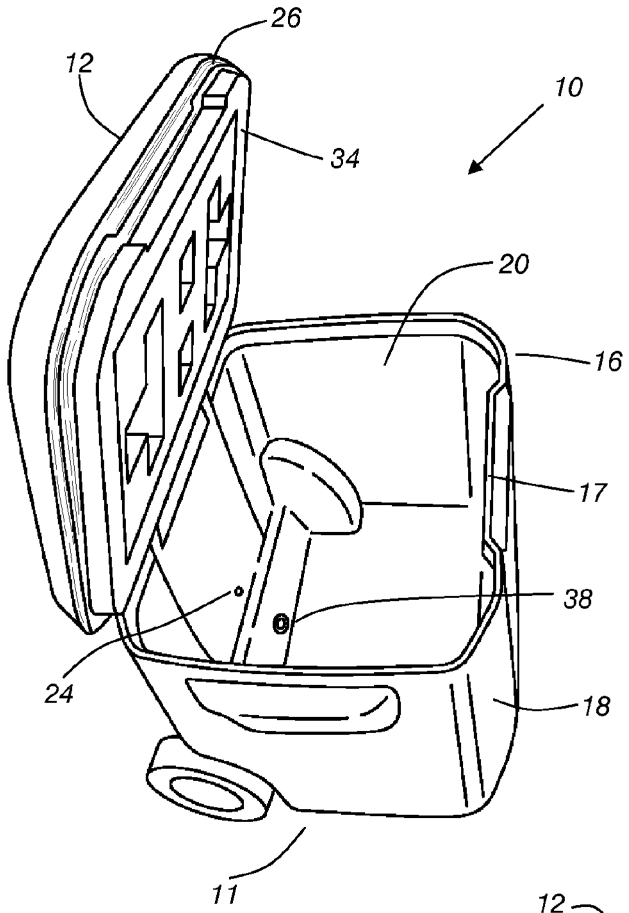
FIG. 1 is a side perspective view of a shocking cooler with the lid open.
Figure 2:
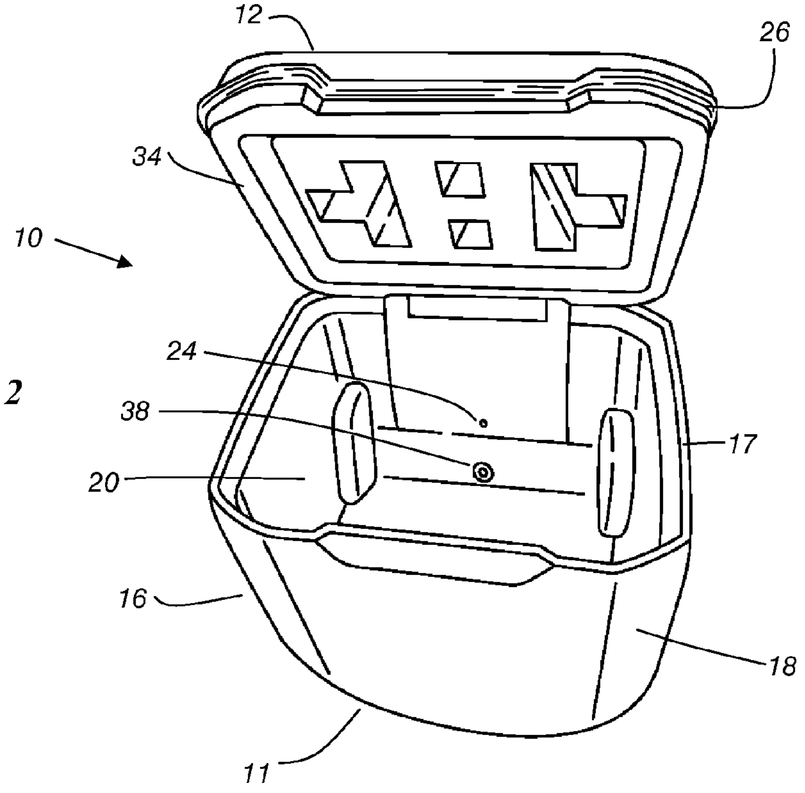
FIG. 2 is a front perspective view of a shocking cooler with the lid open, according to the embodiment of FIG. 1.

According a preferred embodiment of the invention, a shocking cooler 10 is comprised of an ice chest cooler 11 having a lid 12 and lower portion 16, as illustrated in more detail in FIGS. 1-12. A first conductor 24 is located on the lower portion 16, and a second conductor 26 is located on the lid 12, as shown in FIGS. 1-12. The first conductor 24 and second conductor 26 are connected to a power supply 28 via connection cable(s) 42.

Figure 5:
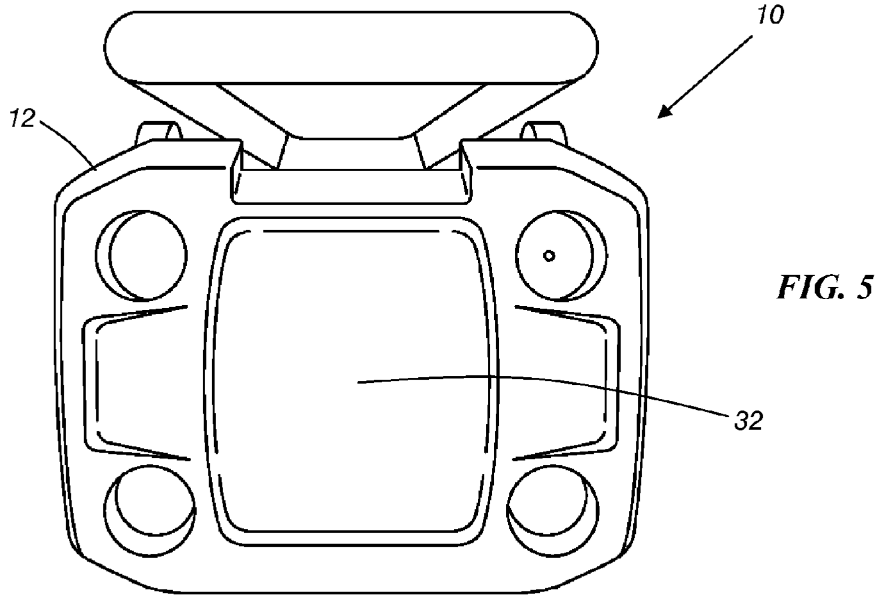
FIG. 5 is a top view of a shocking cooler with the lid closed, according to the embodiment of FIG. 1.
Figure 6:
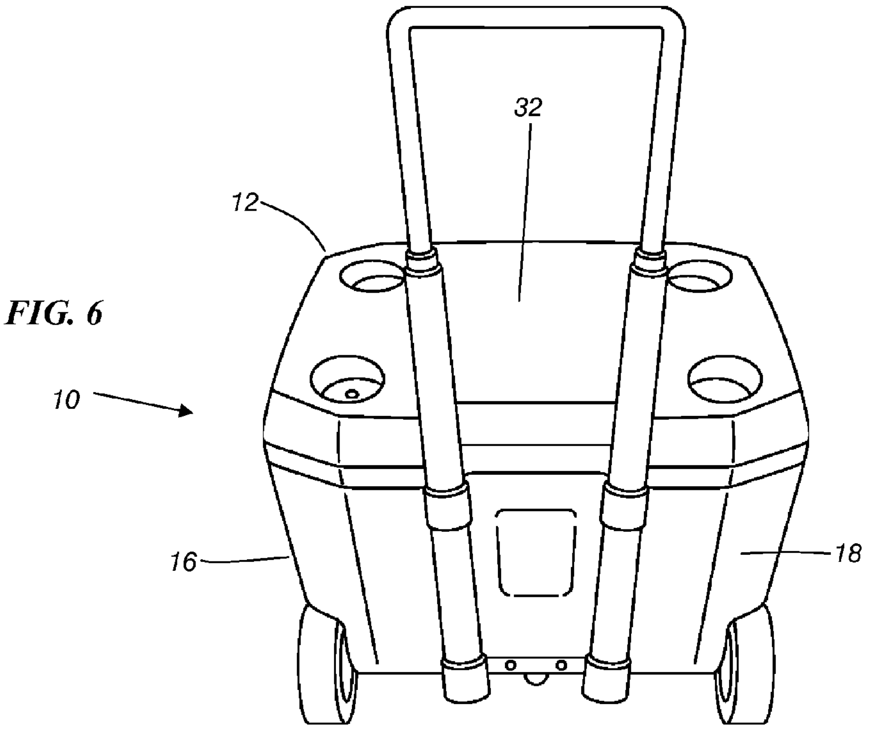
FIG. 6 is a rear perspective view of a shocking cooler with the lid closed, according to the embodiment of FIG. 1.
Figure 9:
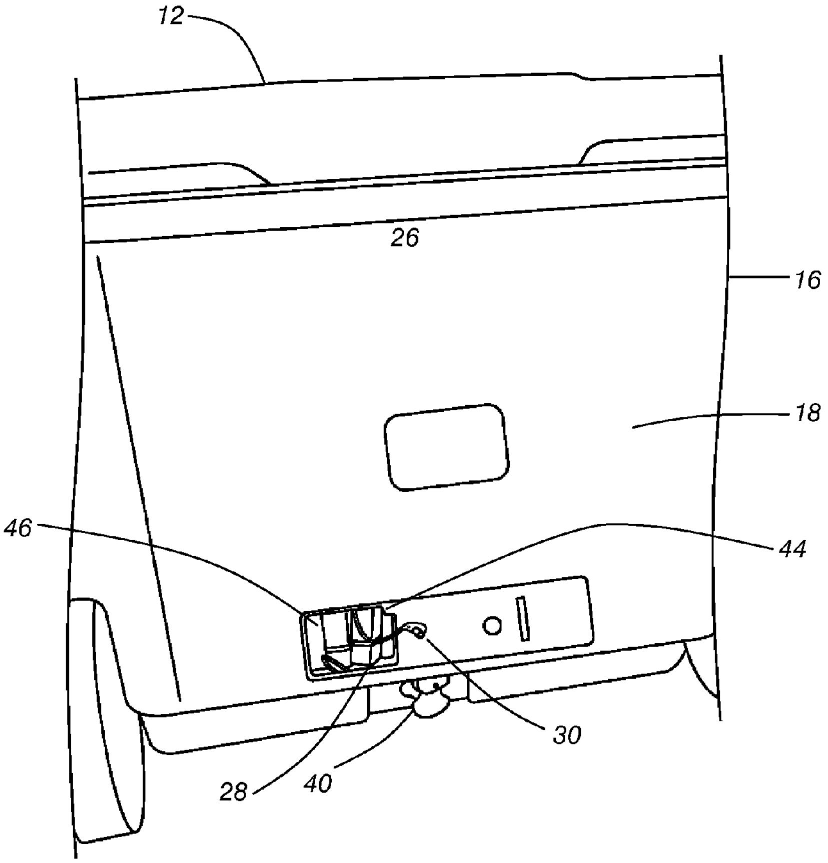
FIG. 9 is a rear perspective view of a shocking cooler showing the compartment, according to the embodiment of FIG. 1.

The lid 12 is rotatbly attached to the lower portion 16, such that the ice chest cooler 11 can be open and closed. The lid 12 has a lid upper surface 32, forming the top part of the ice chest cooler 11, as shown in FIGS. 5 and 6. The lid also has a lid lip region 34, defining a region which makes contact with a lower lip region 17, when the ice chest cooler 11 is closed. In the preferred embodiment, the second conductor 26 is a band of conductive aluminum, extending around the lid lip region 34, as illustrated in FIGS. 1-7.

Figure 12:
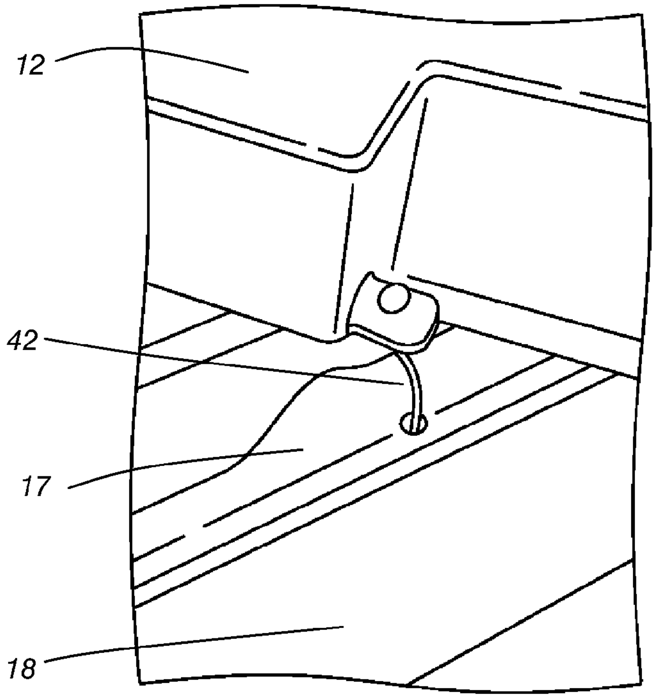
FIG. 12 is a perspective view of the wiring joining the top of the shocking cooler, according to the embodiment of FIG. 1.

Connection cable(s) 42 extends from the second conductor 26, and extends through the lid 12. Connection cable(s) 42 exits from the lid 11 and extends into the lower portion 16, as illustrated in FIG. 12. Connection cable(s) 42 extends from the second conductor 26 to the power supply 28.

The lower portion 16 forms the body of the ice chest cooler 11. The lower portion 16 has side exterior surfaces 18, and side interior surfaces 20. The lower portion 16 also has a lower lip region 17, where the lid 12 rests when the ice chest cooler 11 is closed. An insulating region exists between the side exterior surfaces 18 and side interior surfaces, allowing the ice chest cooler 11 to keep refrigerated drinks and food. The first conductor 24 is a single node of conductive material, extending from a side interior surface 20 into the ice chest cooler 11, as shown in FIGS. 1-4, 7, 8. Connection cable(s) 42 extends from the first conductor 24, and extends through the insulating region 22 (not shown). Connection cable(s) 42 extends from the first conductor 24 to the power supply 28. A drain 38 is located on a side interior surface 20 and extends to a drain plug 40, existing on a side exterior surface 18.

Figure 10:
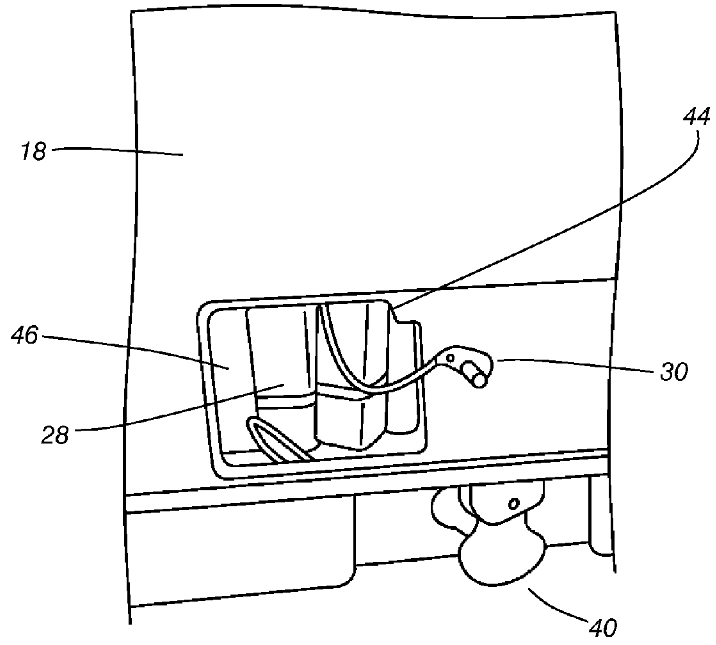
FIG. 10 is a closer view of the compartment, according to the embodiment of FIG. 1.
Figure 11:
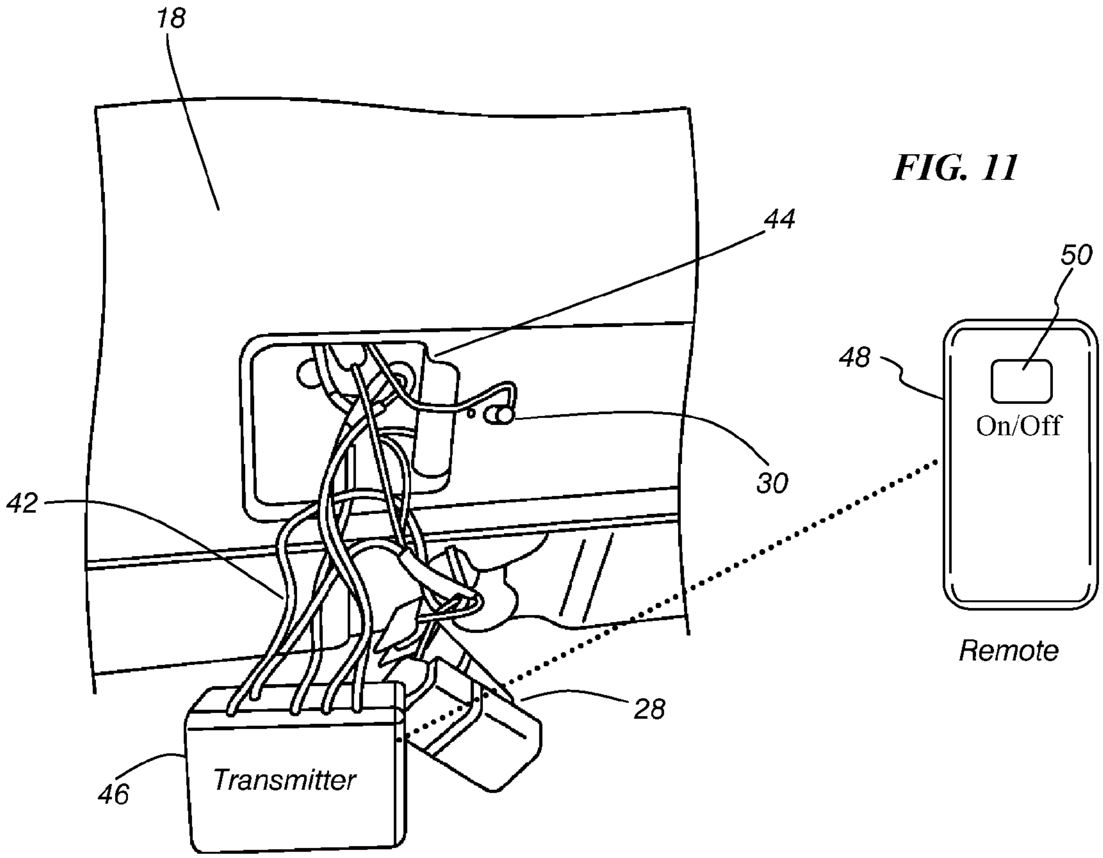
FIG. 11 is a closer view of the compartment and wiring of the battery, controller, and switch, according to the embodiment of FIG. 1.

The first conductor 24 and second conductor 26 are joined to the power supply 28 at alternate connections (either positive (+) or negative (−)) of the power supply 28 by connection cable(s) 42. In the preferred embodiment, the power supply 28 is a 9V battery. A compartment 44 exists in the ice chest cooler 11, as shown in more detail in FIGS. 9-11. The power supply 28 is connected to a switch 30, which allows the shocking cooler 10 to be turned on or off. In the preferred embodiment, the switch 30 is connected to a transmitter 46, which communicates with a remote control 48. The remote control 48 has an arm/disarm button 50 for turning the ice chest cooler 10 on or off. The power supply 28 and transmitter 46, are located in the compartment 44, as shown in FIGS. 10, 11.

Figure 3:
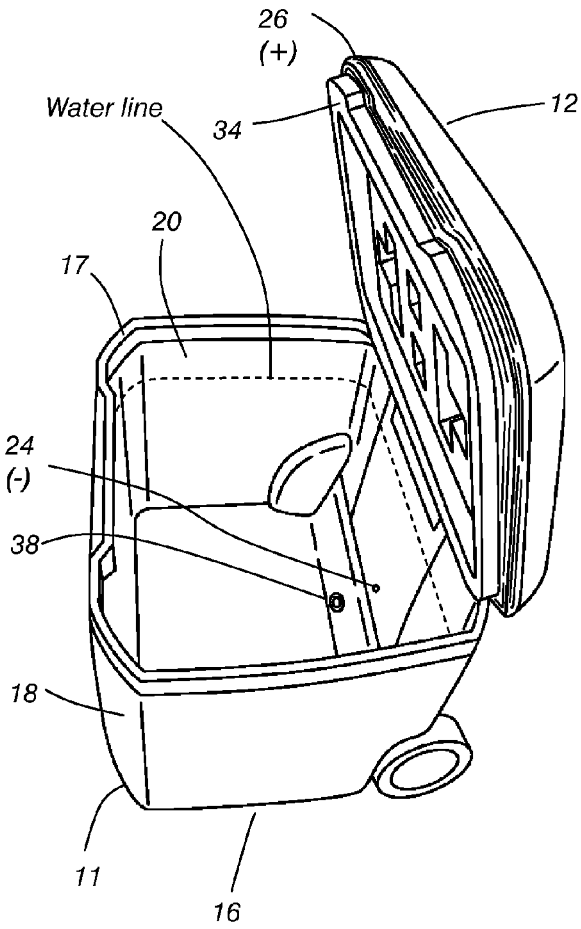
FIG. 3 is a side perspective view of a shocking cooler with water inside the shocking cooler, according to the embodiment of FIG. 1.
Figure 4:
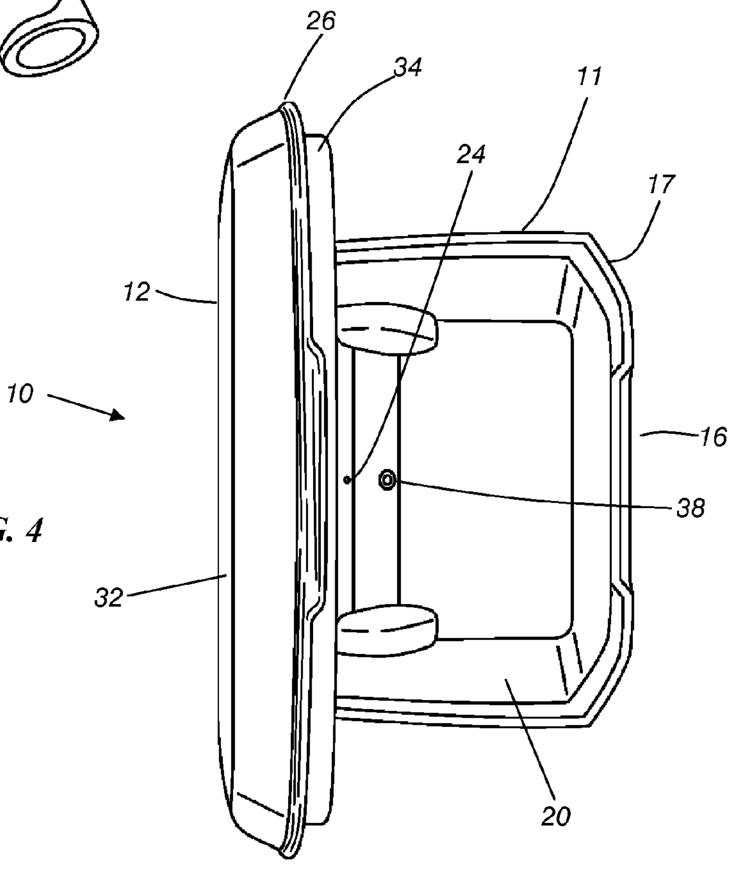
FIG. 4 is a top view of a shocking cooler with the lid open, according to the embodiment of FIG. 1.

In use, water is introduced to the ice chest cooler 11, and is in contact with the first conductor 24, as shown in FIG. 3. The second conductor 26 does not make contact with the water due to its placement at or near the lid 12. When a would be burglar attempts to reach into the ice chest cooler 10, his hand is immersed into the water (which is in contact with the first conductor 24) and his arm makes contact with the second conductor 26, thereby completing the circuit. An electrical shock is thereby issued to the burglar, thwarting attempts to obtain the contents of the ice chest cooler.

Although a preferred embodiment of the invention is shown, other alternatives are contemplated. In other embodiments, the location and configuration of the second conductor 26 may vary. For example, the second conductor 26 may either be located on the lid 12, or on the lower portion 16, located on the lower lip region 17. The second conductor 26 may be configured as an individual element, or a plurality of elements. Moreover, the current, voltage, and switch mechanism used in embodiments may vary. Therefore, the spirit and scope of the appended claims should not be limited to the descriptions of the preferred versions herein.

What is claimed is:

1. A shocking cooler, comprising:

an ice chest cooler having a lid and lower portion, said lower portion having side exterior surfaces, and side interior surfaces, said side exterior surfaces and said side interior surfaces separated by an insulating region, the interior surfaces defined an interior space containing water;

a first conductor located at said lower portion, and extruding from said side interior surface of said ice chest cooler;

a second conductor separated a distance from said first conductor located proximate to said lid; and a power supply joined to said first conductor and said second conductor by connection cables, such that said first conductor and said second conductor are joined to oppositely charged connections of said power supply;

whereby in operation said first conductor is configured to contact said water and said second conductor is configured not to contact said water.

2. The shocking cooler of claim 1, wherein said lid is rotably attached to said lower portion, such that said ice chest cooler can be open and closed.

3. The shocking cooler of claim 1, wherein said lid has a lid lip region which makes contact with a lower lip region located on said lower portion when said ice chest cooler is closed.

4. The shocking cooler of claim 3, wherein said second conductor is a band of conductive material, extending around said lower lip region.

5. The shocking cooler of claim 3, wherein said lid further comprises a lid upper surface, which forms a top of said ice chest cooler.

6. The shocking cooler of claim 1, wherein said connection cables extend from said second conductor through said lid to said power supply.

7. The shocking cooler of claim 1, wherein said first conductor is a single node of conductive material.

8. The shocking cooler of claim 7, wherein said first conductor is located proximate to a bottom surface of said lower portion.

9. The shocking cooler of claim 1, wherein said connection cables extend from said first conductor through said insulating region to said power supply.

10. The shocking cooler of claim 1, further comprising a switch connected to said power supply which turns the shocking cooler on or off.

11. The shocking cooler of claim 10, further comprising a transmitter connected to said power supply and said switch.

12. The shocking cooler of claim 11, further comprising a remote having a button to arm and to disarm the shocking cooler, the remote configured to communicate with said transmitter of said shocking cooler.

13. The shocking cooler of claim 12, further comprising a compartment located on said exterior side surface.

14. The shocking cooler of claim 13, wherein said power supply and said transmitter are located within said compartment.

15. The shocking cooler of claim 1, wherein said power supply is a 9V battery.

16. The shocking cooler of claim 1, wherein said power supply is one or more 9V batteries connected in parallel.

17. The shocking cooler of claim 1, wherein said second conductor is located on said lower portion.

18. The shocking cooler of claim 17, wherein said second conductor is located on said lower lip region of said lower portion.

19. A shocking cooler, comprising:

an ice chest cooler having a lid and lower portion, said lower portion having side exterior surfaces, and side interior surfaces, said side exterior surfaces and said side interior surfaces separated by an insulating region, the ice chest cooler containing water;

a first conductor located at said lower portion, and extruding from said side interior surface of said ice chest cooler;

a second conductor separated a distance from said first conductor located proximate to said lid;

a power supply joined to said first conductor and said second conductor by connection cables, such that said first conductor and said second conductor are joined to oppositely charged connections of said power supply;

a switch connected to said power supply; and a transmitter connected to said switch and power supply, allowing a user to turn on or off the shocking cooler via a remote control;

whereby in operation said first conductor is configured to contact said water and said second conductor is configured not to contact said water.

20. A shocking cooler, comprising:

an ice chest cooler having a lid and lower portion, said lower portion having side exterior surfaces, and side interior surfaces, said side exterior surfaces and said side interior surfaces separated by an insulating region, the ice chest cooler containing water;

a first conductor located at said lower portion, and extruding from said side interior surface of said ice chest cooler, wherein said first conductor is a single conductive node;

a second conductor separated a distance from said first conductor located proximate to said lid and wherein said second conductor is a strip of conductive material extending around said lid;

a power supply joined to said first conductor and said second conductor by connection cables, such that said first conductor and said second conductor are joined to oppositely charged connections of said power supply;

a switch connected to said power supply; and a transmitter connected to said switch and power supply, allowing a user to turn on or off the shocking cooler via a remote control;

whereby in operation said first conductor is configured to contact said water and said second conductor is configured not to contact said water.

* * * * *